(12) United States Patent
Sasakuma et al.

(10) Patent No.: US 9,403,643 B2
(45) Date of Patent: Aug. 2, 2016

(54) RUBBER COMPOSITION FOR CONVEYOR BELT, AND CONVEYOR BELT

(71) Applicant: The Yokohama Rubber Co., LTD., Minato-ku, Tokyo (JP)

(72) Inventors: Hidehiro Sasakuma, Hiratsuka (JP); Ryotaro Suefuji, Hiratsuka (JP); Atsushi Miyajima, Hiratsuka (JP); Gang Hou, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 14/784,861

(22) PCT Filed: Apr. 8, 2014

(86) PCT No.: PCT/JP2014/060165
§ 371 (c)(1),
(2) Date: Oct. 15, 2015

(87) PCT Pub. No.: WO2014/171364
PCT Pub. Date: Oct. 23, 2014

(65) Prior Publication Data
US 2016/0096684 A1    Apr. 7, 2016

(30) Foreign Application Priority Data
Apr. 15, 2013  (JP) ................. 2013-084582

(51) Int. Cl.
*B65G 15/34* (2006.01)
*C08L 9/00* (2006.01)

(52) U.S. Cl.
CPC .. *B65G 15/34* (2013.01); *C08L 9/00* (2013.01)

(58) Field of Classification Search
CPC ........ B65G 15/30; B65G 15/32; B65G 15/34; C08K 3/06; C08K 3/04

USPC .................................................. 198/846, 847
See application file for complete search history.

(56) References Cited

U.S. PATENT DOCUMENTS

| | | | | |
|---|---|---|---|---|
| 4,028,316 A | * | 6/1977 | Matsuo | C08K 3/06 525/354 |
| 4,289,338 A | * | 9/1981 | Cook | B32B 15/08 138/120 |

(Continued)

FOREIGN PATENT DOCUMENTS

| | | |
|---|---|---|
| JP | 2004-018752 | 1/2004 |
| JP | 2004-346220 | 12/2004 |

(Continued)

OTHER PUBLICATIONS

International Search Report for International Application No. PCT/JP2014/060165 dated Jul. 15, 2014, 6 pages, Japan.

*Primary Examiner* — James R Bidwell
(74) *Attorney, Agent, or Firm* — Thorpe North & Western

(57) ABSTRACT

The present technology provides a rubber composition for a conveyor belt. The rubber composition comprises: a rubber component containing butadiene rubber and/or styrene butadiene rubber, carbon black, sulfur, and a vulcanization accelerator; the glass transition temperature of the butadiene rubber and the styrene butadiene rubber being −65° C. or lower; the nitrogen adsorption specific surface area of the carbon black being 90 $m^2/g$ or less; the total content of the butadiene rubber and the styrene butadiene rubber being 50% by mass or greater relative to the content of the rubber component; the content of the carbon black being from 30 to 50 parts by mass per 100 parts by mass of the rubber component; and the mass ratio (sulfur/vulcanization accelerator) of the content of the sulfur to the content of the vulcanization accelerator being 1.5 or less.

20 Claims, 1 Drawing Sheet

(56) References Cited

U.S. PATENT DOCUMENTS

| | | | |
|---|---|---|---|
| 5,119,927 A * | 6/1992 | Bruggemann | B65G 15/34 198/846 |
| 2004/0035686 A1* | 2/2004 | Allen | F16G 3/10 198/847 |
| 2014/0021021 A1* | 1/2014 | Pero | B65G 15/34 198/847 |

FOREIGN PATENT DOCUMENTS

| | | |
|---|---|---|
| JP | 2008-038133 | 2/2008 |
| JP | 2011-074344 | 4/2011 |
| JP | 2012-057001 | 3/2012 |
| WO | WO 2008/007733 | 1/2008 |
| WO | WO 2012/032896 | 4/2011 |

* cited by examiner

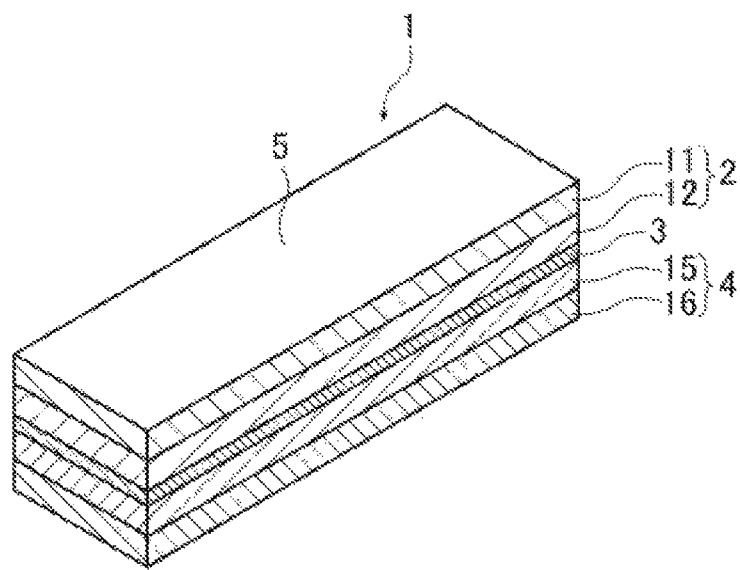

US 9,403,643 B2

RUBBER COMPOSITION FOR CONVEYOR BELT, AND CONVEYOR BELT

TECHNICAL FIELD

The present technology relates to a rubber composition for a conveyor belt that is suitable for a conveyor belt for cold regions, and a conveyor belt.

BACKGROUND

Conveyor belts have been commonly used for transporting materials or the like. However, since the conveyor belts are demanded to have a larger size and higher strength to increase transport volume, enhance transport efficiency, and the like, conveyor belts with total lengths of up to several kilometers have even emerged in recent years.

As a result, equipment costs and power consumption have been increased, and thus belt conveyor systems that require lower costs and lower power consumption have been demanded. In particular, investigations in lowering the costs and power consumption of belt conveyors by improving characteristics of rubber that constitutes the belt have been conducted.

In such a circumstance, claim 1 of Japanese Unexamined Patent Application Publication No. 2008-38133A discloses "a rubber composition for a conveyor belt comprising a rubber component containing natural rubber (NR) and polybutadiene rubber (BR), carbon black, and the like". Japanese Unexamined Patent Application Publication No. 2008-38133A indicates that the use of such a rubber composition for a conveyor belt can reduce the power consumption.

SUMMARY

Meanwhile, as a demand for conveyor belts in cold regions has been increased in recent years, the rubber compositions for conveyor belts are required to exhibit excellent reductions in power consumption at low temperatures when the rubber compositions are formed into conveyor belts. Note that "cold region" refers to a region where the lowest temperature of the operating environment in a year is 0° C. or lower.

When the inventors of the present technology investigated in a rubber composition for a conveyor belt comprising a rubber component containing butadiene rubber, carbon black, sulfur, and a vulcanization accelerator by using Japanese Unexamined Patent Application Publication No. 2008-38133A as a reference, it was found that tan δ at low temperatures (e.g. −40° C.) of the rubber composition after vulcanization is high, and reductions in power consumption at low temperature do not satisfy the level of reduction that has been demanded in recent years.

Therefore, in the light of the circumstances described above, the present technology provides a rubber composition for a conveyor belt, the rubber composition allowing excellent reductions in power consumption at low temperatures when a conveyor belt is formed, and also to provide a conveyor belt that is formed by using such a rubber composition for a conveyor belt.

As a result of diligent research on the problems described above, the inventors of the present technology have found that, by blending a specific rubber component, specific carbon black, sulfur, and a vulcanization accelerator, and by setting the mass ratio (sulfur/vulcanization accelerator) of the content of the sulfur to the content of the vulcanization accelerator to be within a specific range, excellent reductions in power consumption can be achieved at low temperatures when a conveyor belt is formed, and thus completed the present technology.

(1) A rubber composition for a conveyor belt comprising: a rubber component containing butadiene rubber and/or styrene butadiene rubber, carbon black, sulfur, and a vulcanization accelerator;
a glass transition temperature of the butadiene rubber and the styrene butadiene rubber being −65° C. or lower;
a nitrogen adsorption specific surface area of the carbon black being 90 $m^2/g$ or less;
a total content of the butadiene rubber and the styrene butadiene rubber being 50% by mass or greater relative to a content of the rubber component;
a content of the carbon black being from 30 to 50 parts by mass per 100 parts by mass of the rubber component; and
a mass ratio (sulfur/vulcanization accelerator) of a content of the sulfur to a content of the vulcanization accelerator being 1.5 or less.

(2) The rubber composition for a conveyor belt according to (1) above, wherein the nitrogen adsorption specific surface area of the carbon black is 60 $m^2/g$ or greater.

(3) The rubber composition for a conveyor belt according to (1) or (2) above, wherein the rubber composition is used in a conveyor belt for use in cold regions.

(4) A conveyor belt formed by using the rubber composition for a conveyor belt described in any one of (1) to (3) above.

(5) A conveyor belt comprising: an upper cover rubber layer, a reinforcing layer, and a lower cover rubber layer;
at least the lower cover rubber layer being formed by using the rubber composition for a conveyor belt described in any one of (1) to (3) above.

(6) The conveyor belt according to (4) or (5) above, wherein the conveyor belt is for use in cold regions.

As described below, according to the present technology, a rubber composition for a conveyor belt, the rubber composition allowing excellent reductions in power consumption at low temperatures when a conveyor belt is formed, and also a conveyor belt that is formed by using such a rubber composition for a conveyor belt can be provided.

BRIEF DESCRIPTION OF THE DRAWING(S)

FIG. 1 is a cross-sectional view schematically illustrating an example of preferred embodiments of the conveyor belt of the present technology.

DETAILED DESCRIPTION

The rubber composition for a conveyor belt of the present technology and the conveyor belt formed by using the rubber composition for a conveyor belt of the present technology will be described below. Rubber composition for conveyor belt The rubber composition for a conveyor belt of the present technology (hereinafter, also referred to as "composition of the present technology") comprises: a rubber component containing butadiene rubber and/or styrene butadiene rubber, carbon black, sulfur, and a vulcanization accelerator; the glass transition temperature of the butadiene rubber and the styrene butadiene rubber being −65° C. or lower; the nitrogen adsorption specific surface area of the carbon black being 90 $m^2/g$ or less; the total content of the butadiene rubber and the styrene butadiene rubber being 50% by mass or greater relative to the content of the rubber component; the content of the carbon black being from 30 to 50 parts by mass per 100 parts by mass of the rubber component; and the mass ratio (sulfur/ vulcanization accelerator) of the content of the sulfur to the content of the vulcanization accelerator being 1.5 or less.

As described above, the composition of the present technology contains a specific rubber component, specific carbon black, sulfur, and a vulcanization accelerator, and the mass ratio (sulfur/vulcanization accelerator) of the content of the sulfur to the content of the vulcanization accelerator is within a specific range.

It is conceived that, since the composition of the present technology has such a constitution, the rubber composition achieves excellent reductions in power consumption at low temperatures when a conveyor belt is formed.

Although the reason is not clear, it is assumed to be as follows.

As described below, the rubber component contained in the present technology contains the total of 50% by mass or greater of butadiene rubber and/or styrene butadiene rubber having a glass transition temperature of −65° C. or lower. Also as described below, the nitrogen adsorption specific surface area of the carbon black contained in the present technology is 90 m$^2$/g or less. It is conceived that, as a result, the heat build-up during deformation in a low temperature environment can be suppressed.

Furthermore, as described above, the mass ratio (sulfur/vulcanization accelerator) of the content of the sulfur to the content of the vulcanization accelerator of the composition of the present technology is 1.5 or less. Because of this, the crosslinked structure obtained by vulcanizing the composition of the present technology is significantly highly uniform. As a result, it is conceived that the stress dispersion during deformation will be excellent, and energy loss will be small.

Because of these reasons, it is conceived that the conveyor belt formed by using the composition of the present technology achieves excellent reductions in power consumption at low temperatures.

This is also assumed from the fact that, as described in comparative examples described below, the reductions of power consumption is insufficient at low temperatures for the case where the total content of the butadiene rubber and the styrene butadiene rubber is less than 50% by mass relative to the content of the rubber component (Comparative Example 1), for the case where the glass transition temperature of either the butadiene rubber or the styrene butadiene rubber exceeds −65° C. even when the total content of the butadiene rubber and the styrene butadiene rubber is 50% by mass or greater relative to the content of the rubber component (Comparative Examples 2 to 4), for the case where the nitrogen adsorption specific surface area of the carbon black exceeds 90 m$^2$/g (Comparative Example 6), and for the case where the ratio of sulfur/vulcanization accelerator exceeds 1.5 (Comparative Example 5).

Each component contained in the composition of the present technology will be described in detail hereinafter.

<Rubber Component>

The rubber component contained in the composition of the present technology contains butadiene rubber (BR) and/or styrene butadiene rubber (SBR).

The butadiene rubber is not particularly limited as long as the butadiene rubber is a polymer of butadiene monomers. Note that the butadiene rubber can be produced by using a plurality of types of butadiene monomers.

Examples of the butadiene monomer include 1,3-butadiene, 2-methyl-1,3-butadiene, 2,3-dimethyl-1,3-butadiene, 2-chloro-1,3-butadiene, and the like.

The weight average molecular weight of the butadiene rubber is preferably 400,000 or greater, and more preferably 450,000 or greater, from the perspectives of strength of the formed conveyor belt and handleability of the composition. Although the upper limit is not particularly limited, the upper limit is preferably 2,000,000 or less.

Note that, in the present application, the weight average molecular weight (Mw) is determined by gel permeation chromatography (GPC) in terms of standard polystyrene using tetrahydrofuran as a solvent.

The glass transition temperature (Tg) of the butadiene rubber is −65° C. or lower. In particular, the Tg is preferably −90° C. or lower. The lower limit of the Tg is not particularly limited; however, the lower limit is typically −130° C. or higher.

Note that, in the present application, Tg is determined by measuring at a rate of temperature increase of 20° C./min using a differential scanning calorimeter (DSC) and calculating by the midpoint method.

The styrene butadiene rubber is not particularly limited as long as the styrene butadiene rubber is a copolymer of butadiene monomer(s) and styrene monomer(s). The styrene butadiene rubber can be produced by using a plurality of types of butadiene monomers and/or styrene monomers.

Examples of the styrene monomer include styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrene, N,N-dimethylaminoethylstyrene, and the like.

The weight average molecular weight of the styrene butadiene rubber is preferably 250,000 or greater, and more preferably 300,000 or greater, from the perspectives of strength of the formed conveyor belt and handleability of the composition. Although the upper limit is not particularly limited, the upper limit is preferably 2,000,000 or less. The method to determine the weight average molecular weight is as described above.

The glass transition temperature (Tg) of the styrene butadiene rubber is −65° C. or lower. In particular, the Tg is preferably −70° C. or lower. The lower limit of the Tg is not particularly limited; however, the lower limit is typically −90° C. or higher, and preferably −80° C. or higher. The method to determine the Tg is as described above.

The total content of the butadiene rubber and the styrene butadiene rubber is 50% by mass or greater relative to the content of the rubber component. In particular, the total content is preferably 60% by mass or greater from the perspective of wear resistance of the formed conveyor belt.

The rubber component may contain another rubber, other than the butadiene rubber and the styrene butadiene rubber, as long as the rubber component contains the total content of 50% by mass or greater of the butadiene rubber and the styrene butadiene rubber.

Such a rubber is not particularly limited; however, examples thereof include natural rubber (NR), isoprene rubber (IR), acrylonitrile-butadiene copolymer rubber (NBR), butyl rubber (IIR), halogenated butyl rubber (Br-IIR, Cl-IIR), chloroprene rubber (CR), and the like.

<Carbon Black>

The carbon black contained in the composition of the present technology is not particularly limited as long as the carbon black has the nitrogen adsorption specific surface area (N$_2$SA) of 90 m$^2$/g or less.

Note that "nitrogen adsorption specific surface area" described above is an alternative characteristic of surface area that can be used in the adsorption of carbon black to the rubber molecules, and an amount of nitrogen adsorption to the surface of the carbon black is a measurement taken in accordance with JIS K6217-2:2001 (Part 2: Determination of specific surface area—Nitrogen adsorption methods—Single-point procedures).

The $N_2SA$ of the carbon black is preferably 60 $m^2/g$ or greater from the perspective of making the rate of change of tan δ (20° C.) when the composition is over-vulcanized smaller.

The lower limit of the $N_2SA$ of the carbon black is not particularly limited; however, the $N_2SA$ is typically 10 $m^2/g$ or greater.

Examples of the carbon black include HAF (High Abrasion Furnace), FEF (Fast Extruding Furnace), GPF (General Purpose Furnace), SRF (Semi-Reinforcing Furnace), and the like.

The content of the carbon black is from 30 to 50 parts by mass per 100 parts by mass of the rubber component.

<Sulfur>

The sulfur contained in the composition of the present technology is not particularly limited; however, examples of the sulfur include powdered sulfur, precipitated sulfur, highly dispersible sulfur, surface treated sulfur, insoluble sulfur, dimorpholine disulfide, alkylphenol disulfide, and the like. One type of these can be used alone, or a combination of two or more types of these can be used.

The content of the sulfur is not particularly limited; however, from the perspectives of strength of the formed conveyor belt and handleability of the composition, the content is preferably from 1.0 to 4.0 parts by mass, and more preferably from 1.2 to 3.0 parts by mass, per 100 parts by mass of the rubber component.

<Vulcanization Accelerator>

The vulcanization accelerator contained in the composition of the present technology is not particularly limited; however, examples of the vulcanization accelerator include aldehyde/ammonia-based, guanidine-based, thiourea-based, thiazole-based, sulfenamide-based, thiuram-based, and dithiocarbamate-based vulcanization accelerators, and the like.

Specific examples of the aldehyde/ammonia-based vulcanization accelerator include hexamethylene tetramine (H) and the like.

Specific examples of the guanidine-based vulcanization accelerator include diphenylguanidine and the like.

Specific examples of the thiourea-based vulcanization accelerator include ethylene thiourea and the like.

Specific examples of the thiazole-based vulcanization accelerator include dibenzothiazyl disulfide (DM), 2-mercaptobenzothiazole, Zn salts thereof, and the like.

Specific examples of the sulfenamide-based vulcanization accelerator include N-cyclohexyl-2-benzothiazolylsulfenamide (CZ), N-t-butyl-2-benzothiazolylsulfenamide (NS), and the like.

Specific examples of the thiuram-based vulcanization accelerator include tetramethylthiuram disulfide (TMTD), dip entamethylenethiuram tetrasulfide, and the like.

Specific examples of the dithiocarbamate-based vulcanization accelerator include Na-dimethyldithiocarbamate, Zn-dimethyldithiocarbamate, Te-diethyldithiocarbamate, Cu-dimethyldithiocarbamate, Fe-dimethyldithiocarbamate, pipecoline pipecolyldithiocarbamate, and the like.

The content of the vulcanization accelerator is not particularly limited; however, from the perspectives of strength of the formed conveyor belt and handleability of the composition, the content is preferably from 0.5 to 3 parts by mass, and more preferably from 1.0 to 2.0 parts by mass, per 100 parts by mass of the rubber component.

In the composition of the present technology, the mass ratio (sulfur/vulcanization accelerator) of the content of the sulfur to the content of the vulcanization accelerator is 1.5 or less. In other words, the content of the sulfur is at most 1.5 times the content of the vulcanization accelerator.

The mass ratio (hereinafter, also referred to as "sulfur/vulcanization accelerator") is preferably 1.3 or less, and more preferably 1.1 or less, from the perspectives of achieving even more reductions in power consumption at low temperatures and making the rate of change of tan δ (20° C.) when the composition is over-vulcanized even smaller.

<Other Component: Optional Component>

In addition to the components described above, the composition of the present technology may contain other components such as silica, silane coupling agents, vulcanizing agents other than the sulfur, vulcanization aids, and vulcanization retarders. Furthermore, the composition may contain various compounding agents in a range that does not impair the object of the present technology.

(Silica)

The silica is not particularly limited; however, examples of the silica include fumed silica, calcined silica, precipitated silica, pulverized silica, molten silica, fine silicic anhydride powder, fine hydrous silicic acid powder, hydrous aluminum silicate, hydrous calcium silicate, and the like. One type of these can be used alone, or a combination of two or more types of these can be used.

(Silane Coupling Agent)

The silane coupling agent is not particularly limited; however, use of polysulfide-based silane coupling agent that is used for rubbers is preferable.

Specific examples of the polysulfide-based silane coupling agent include bis(3-(triethoxysilyl)propyl)tetrasulfide, bis(3-(triethoxysilyl)propyl)disulfide, and the like.

(Vulcanizing Agent Other than the Sulfur)

The vulcanizing agent other than the sulfur is not particularly limited; however, examples of the vulcanizing agent include organic peroxide-based vulcanizing agents, metal oxide-based vulcanizing agents, phenolic resins, quinone dioxime, and the like.

Specific examples of the organic peroxide-based vulcanizing agent include benzoyl peroxide, t-butyl hydroperoxide, 2,4-dichlorobenzoyl peroxide, 2,5-dimethyl-2,5-di(t-butylperoxy)hexane, 2,5-dimethylhexane-2,5-di(peroxyl benzoate), and the like.

Other examples include magnesium oxide, litharge, p-quinone dioxime, p-dibenzoylquinone dioxime, poly-p-dinitrosobenzene, methylenedianiline, and the like.

(Vulcanization Aid)

As the vulcanization aid, aids that are typically used for rubbers can be used in combination. Examples of the vulcanization aid include flowers of zinc, stearic acid, oleic acid, Zn salts thereof, and the like.

(Vulcanization Retarder)

Specific examples of the vulcanization retarder include organic acids, such as phthalic anhydride, benzoic acid, salicylic acid, and acetylsalicylic acid; nitroso compounds, such as polymers of N-nitroso-diphenylamine, N-nitroso-phenyl-β-naphthylamine, and N-nitroso-trimethyl-dihydroquinoline; halides, such as trichloromelanine; 2-mercaptobenzimidazole, Santogard PVI; and the like.

Examples of the compounding agent include fillers other than carbon black described above, antiaging agents, antioxidants, pigments (dyes), plasticizers, thixotropy-imparting agents, UV absorbents, flame retardants, solvents, surfactants (including leveling agents), dispersing agents, dehydrating agents, anticorrosives, adhesion-imparting agents, antistatic agents, processing aids, and the like.

As these compounding agents, typical compounding agents for compositions for rubbers can be used. The compounded amount of these is also not particularly limited and can be any amount.

The composition of the present technology is suitable for use in conveyor belts for cold regions since, as indicated by working examples described below, tan δ at low temperatures (e.g. −40° C.) after vulcanization is small.

Furthermore, the composition of the present technology is also suitable for use in conveyor belts having an endless part (e.g. long distance conveyor belts) since, as indicated by working examples described below, the rate of change of tan δ (20° C.) when the composition is over-vulcanized is small.

<Manufacturing Method>

The production method of the composition of the present technology is not particularly limited, and, for example, a method in which the rubber component and the carbon black described above are kneaded by a Banbury mixer or the like, and then the sulfur, the vulcanization accelerator, and the like are kneaded by a roll kneader or the like can be employed.

Also, the vulcanization can be performed in typical conditions. Specifically, the vulcanization can be performed by, for example, heating at a temperature of approximately 140 to 150° C. for 0.5 hours.

[Conveyor Belt]

The conveyor belt of the present technology is a conveyor belt formed by using the composition of the present technology described above.

The conveyor belt of the present technology is, as described above, suitable for a conveyor belt for cold regions since the conveyor belt achieves excellent reductions in power consumption at low temperatures.

As a preferred embodiment of the conveyor belt of the present technology, a conveyor belt having an upper cover rubber layer, a reinforcing layer, and a lower cover rubber layer, at least the lower cover rubber layer being formed by using the composition of the present technology described above can be exemplified.

Referring to FIG. 1, the preferred embodiment of the conveyor belt of the present technology will be described below.

FIG. 1 is a cross-sectional view schematically illustrating an example of preferred embodiments of the conveyor belt of the present technology. In FIG. 1, 1 is a conveyor belt, 2 is an upper cover rubber layer, 3 is a reinforcing layer, 4 is a lower cover rubber layer, 5 is a conveying face for transporting articles, 11 and 16 are outer layers, and 12 and 15 are inner layers.

As illustrated in FIG. 1, in the conveyor belt 1, the reinforcing layer 3 is provided as a middle layer, and the upper cover rubber layer 2 and the lower cover rubber layer 4 are respectively provided on the two sides of the middle layer. The upper cover rubber layer 2 is composed of two layers, which are the outer layer 11 and the inner layer 12. The lower cover rubber layer 4 is composed of two layers, which are the outer layer 16 and the inner layer 15. Note that the outer layers and the inner layers (the outer layer 11 and the inner layer 12, and the outer layer 16 and the inner layer 15) of the upper cover rubber layer 2 and the lower cover rubber layer 4 may be formed by using rubber compositions that differ each other.

In FIG. 1, the upper cover rubber layer 2 is composed of two layers, which are the outer layer 11 and the inner layer 12; however, in the conveyor belt of the present technology, the number of the layers that constitute the upper cover rubber layer 2 is not limited to two, and the number may be one or three or more. Furthermore, for the case where the number of the layers is three or more, these layers may be formed by using rubber compositions that differ each other. The same applies to the lower cover rubber layer 4.

The outer layer 11 that constitutes the conveying face for transporting articles 5 of the upper cover rubber layer 2 is preferably formed by a rubber composition that has excellent heat resistance, abrasion resistance, oil resistance, and the like. Furthermore, the inner layer 12 of the upper cover rubber layer 2 contributes to adhesion of the reinforcing layer 3 and the outer layer 11. Therefore, the upper cover rubber layer 2 is preferably composed of two layers, which are an outer layer and an inner layer.

The outer layer 16 constituting the back side surface of the lower cover rubber layer 4 is formed by the rubber composition of the present technology. Furthermore, the inner layer 15 of the lower cover rubber layer 4 is preferably formed by another rubber composition since costs for production and adhesion to the reinforcing layer 3 are regarded as important. Therefore, the cover rubber layer 4 is preferably composed of two layers.

The core of the reinforcing layer 3 is not particularly limited, and a core that is typically used in conveyor belt can be suitably selected for use. Specific examples of the core include a core formed by coating and infiltrating mucilage into a material formed from cotton cloth and chemical fibers or synthetic fibers; a core formed by subjecting a material formed from cotton cloth having chemical fibers or synthetic fibers woven therein to RFL treatment; specially woven nylon canvas, steel cords, and the like. One type of these can be used alone, or a laminate of two or more types of these can be used.

Furthermore, the shape of the reinforcing layer 3 is not particularly limited. The shape may be a sheet shape as illustrated in FIG. 1, and reinforcing wires, having a wire shape, may be embedded in parallel.

The rubber composition that forms the inner layer 12 of the upper cover rubber layer 2 and the inner layer 15 of the lower cover rubber layer 4 is not particularly limited, and the rubber composition that is typically used in conveyor belts can be suitably selected for use. One type of these can be used alone, or a mixture of two or more types of these can be used.

The rubber composition for forming the outer layer 11 of the upper cover rubber layer 2 is not particularly limited, and a rubber composition that is typically used in conveyor belts can be suitably selected for use depending on basic characteristics that are required of the outer layer (e.g. heat resistance, abrasion resistance, oil resistance, and the like).

Since, in the conveyor belt 1, the outer layer 16 of the lower cover rubber layer 4 is formed from the rubber composition of the present technology, the conveyor belt 1 achieves excellent reductions in power consumption at low temperatures.

The thickness of the lower cover rubber layer 4 is preferably from 5 to 20 mm, and more preferably from 6 to 15 mm. Note that the thickness of the lower cover rubber layer 4 refers to the total thickness of layers when the lower cover rubber layer 4 is composed of an inner layer 15 and an outer layer 16.

If the thickness of the lower cover rubber layer 4 is within this range, curling (cupping) of belt caused by deterioration of rubber or the like can be prevented even when the belt is used for transporting an article to be transported that is at a high temperature.

EXAMPLES

Hereinafter, the present technology will be further described in detail using examples; however, the present technology is not limited to these.

Working Examples 1 to 5, Comparative Examples 1 to 6

The components described in Table 1 below were mixed at proportions (part by mass) described in Table 1 below to prepare rubber compositions for a conveyor belt.

<Coefficient of Loss (tan δ)>

The obtained rubber composition was vulcanized at 148° C. for 30 minutes to prepare a vulcanized rubber composition. Furthermore, a test piece was obtained by cutting the prepared vulcanized rubber composition into a strip shape (length 20 mm×width 5 mm×thickness 2 mm).

Using the obtained test piece, tan δ was measured using a viscoelastic spectrometer (manufactured by Toyo Seiki Seisaku-sho, Ltd.; measurement temperatures: −40° C., −20° C., and 20° C.). Note that the measurement of tan δ was performed by stretching the test piece for 10% and applying vibration of amplitude of ±2% at frequency of 20 Hz. The results are shown in Table 1. From the perspective of achieving excellent reductions in power consumption at low temperatures, practically, tan δ at −40° C. is preferably 0.600 or less.

Note that tan δ at −40° C. of Comparative Example 2 could not be measured since the tan δ exceeded the upper limit for measurement.

<Rate of Change of tan δ (20° C.) when Composition was Over-Vulcanized>

The obtained rubber composition was vulcanized at 148° C. for 90 minutes to prepare an over-vulcanized rubber composition. Using the prepared over-vulcanized rubber composition, tan δ (20° C.) was measured as described above.

Using the measured "tan δ (20° C.) of over-vulcanized rubber composition" and the "tan δ (20° C.) of vulcanized rubber composition" measured as described above, "rate of change of tan δ (20° C.) when the composition was over-vulcanized" was calculated using the following formula.

Rate of change of tan δ (20° C.) when the composition was over-vulcanized={(tan δ (20° C.) of over-vulcanized rubber composition)−(tan δ (20° C.) of vulcanized rubber composition)}/(tan δ (20° C.) of vulcanized rubber composition)

<Processability>

The rubber was wrapped around a roll. Then, the rubber that was wrapped around the roll and that exhibited excellent workability in turning was evaluated as "A", and the rubber that caused slack when wrapped around the roll and that resulted in poor workability in turning was evaluated as "B". The results are shown in Table 1.

TABLE 1

|  |  | Comparative Example 1 | Comparative Example 2 | Comparative Example 3 |
|---|---|---|---|---|
| Rubber Component | NR (Tg: −60° C.) | 70 | 40 | 40 |
|  | BR (Tg: −105° C.) | 30 |  | 40 |
|  | SBR1 (Tg: −22° C.) |  | 60 |  |
|  | SBR2 (Tg: −54° C.) |  |  | 20 |
|  | SBR3 (Tg: −74° C.) |  |  |  |
|  | SBR4 (Tg: −71° C.) |  |  |  |
| Carbon black | CB1 ($N_2SA$: 101 $m^2/g$) |  |  |  |
|  | CB2 ($N_2SA$: 90 $m^2/g$) | 30 | 30 |  |
|  | CB3 ($N_2SA$: 70 $m^2/g$) |  |  | 35 |
|  | CB4 ($N_2SA$: 40 $m^2/g$) |  |  |  |
| Sulfur |  | 3.04 | 1.72 | 1.52 |
| Vulcanization accelerator |  | 1.5 | 1.7 | 1.5 |
| Sulfur/vulcanization accelerator |  | 2.03 | 1.01 | 1.01 |
| tanδ | −40° C. | 1.116 | Unmeasurable | 0.715 |
|  | −20° C. | 0.353 | 0.858 | 0.274 |
|  | 20° C. | 0.067 | 0.228 | 0.132 |
| Rate of change of tanδ (20° C.) when over-vulcanized |  | 0.40 | 0.06 | 0.09 |
| Processability |  | A | A | A |

|  |  | Comparative Example 4 | Comparative Example 5 | Comparative Example 6 |
|---|---|---|---|---|
| Rubber Component | NR (Tg: −60° C.) | 40 | 40 | 40 |
|  | BR (Tg: −105° C.) | 30 | 60 | 60 |
|  | SBR1 (Tg: −22° C.) |  |  |  |
|  | SBR2 (Tg: −54° C.) | 30 |  |  |
|  | SBR3 (Tg: −74° C.) |  |  |  |
|  | SBR4 (Tg: −71° C.) |  |  |  |
| Carbon black | CB1 ($N_2SA$: 101 $m^2/g$) |  |  | 35 |
|  | CB2 ($N_2SA$: 90 $m^2/g$) |  |  |  |
|  | CB3 ($N_2SA$: 70 $m^2/g$) | 35 | 35 |  |
|  | CB4 ($N_2SA$: 40 $m^2/g$) |  |  |  |
| Sulfur |  | 1.52 | 2.08 | 1.52 |
| Vulcanization accelerator |  | 1.5 | 1.1 | 1.5 |
| Sulfur/vulcanization accelerator |  | 1.01 | 1.89 | 1.01 |
| tanδ | −40° C. | 0.825 | 0.656 | 0.615 |
|  | −20° C. | 0.314 | 0.245 | 0.247 |
|  | 20° C. | 0.145 | 0.112 | 0.141 |

TABLE 1-continued

| | | | | |
|---|---|---|---|---|
| Rate of change of tan δ (20° C.) when over-vulcanized | | 0.06 | 0.27 | 0.09 |
| Processability | | B | A | A |

| | | Working Example 1 | Working Example 2 | Working Example 3 | Working Example 4 | Working Example 5 |
|---|---|---|---|---|---|---|
| Rubber Component | NR (Tg: −60° C.) | 40 | 40 | 20 | 20 | 40 |
| | BR (Tg: −105° C.) | 60 | 60 | 60 | 60 | 60 |
| | SBR1 (Tg: −22° C.) | | | | | |
| | SBR2 (Tg: −54° C.) | | | | | |
| | SBR3 (Tg: −74° C.) | | | 20 | | |
| | SBR4 (Tg: −71° C.) | | | | 20 | |
| Carbon black | CB1 ($N_2SA$: 101 $m^2/g$) | | | | | |
| | CB2 ($N_2SA$: 90 $m^2/g$) | | | | | |
| | CB3 ($N_2SA$: 70 $m^2/g$) | 35 | | | | 35 |
| | CB4 ($N_2SA$: 40 $m^2/g$) | | 38 | 38 | 38 | |
| Sulfur | | 1.52 | 1.52 | 1.44 | 1.44 | 2.25 |
| Vulcanization accelerator | | 1.5 | 1.5 | 1.5 | 1.5 | 1.5 |
| Sulfur/vulcanization accelerator | | 1.01 | 1.01 | 0.96 | 0.96 | 1.50 |
| tan δ | −40° C. | 0.590 | 0.578 | 0.390 | 0.436 | 0.600 |
| | −20° C. | 0.244 | 0.221 | 0.174 | 0.185 | 0.245 |
| | 20° C. | 0.117 | 0.096 | 0.100 | 0.100 | 0.118 |
| Rate of change of tan δ (20° C.) when over-vulcanized | | 0.14 | 0.22 | 0.15 | 0.13 | 0.19 |
| Processability | | A | A | B | B | A |

The details of each component shown in Table 1 above are as follows.

NR: natural rubber (RSS#3, Tg: −60° C.)
BR: butadiene rubber (Nipol BR1220, Tg: −105° C., manufactured by Zeon Corporation)
SBR1: styrene butadiene rubber (Nipol NS116, Tg: −22° C., manufactured by Zeon Corporation)
SBR2: styrene butadiene rubber (Nipol 1502, Tg: −54° C., manufactured by Zeon Corporation)
SBR3: styrene butadiene rubber (Tufdene 1000R, Tg: −74° C., manufactured by Asahi Kasei Corporation)
SBR4: styrene butadiene rubber (Tufdene 2000R, Tg: −71° C., manufactured by Asahi Kasei Corporation)
CB1: carbon black (ISAF) (Niteron #300, $N_2SA$: 101 $m^2/g$, manufactured by NSCC Carbon Co., Ltd.)
CB2: carbon black (HAF) (Show black N339, $N_2SA$: 90 $m^2/g$, manufactured by Cabot Japan K.K.)
CB3: carbon black (HAF) (Show black N330, $N_2SA$: 70 $m^2/g$, manufactured by Cabot Japan K.K.)
CB4: carbon black (FEF) (Diablack E, $N_2SA$: 40 $m^2/g$, manufactured by Mitsubishi Chemical Corporation)
Sulfur: oil-treated sulfur (manufactured by Hosoi Chemical Industry Co., Ltd.)
Vulcanization accelerator: N-tert-butyl-2-benzothiazolyl sulfenamide (Nocceler NS, manufactured by Ouchi Shinko Chemical Industrial Co., Ltd.)

As is clear from Table 1, all of Working Examples 1 to 5 of the present application containing a specific rubber component, specific carbon black, sulfur, and a vulcanization accelerator, and having the ratio "sulfur/vulcanization accelerator" of 1.5 or less achieved excellent reductions in power consumption at low temperatures.

When Working Example 1 was compared to Working Example 2, Working Example 1, which had the nitrogen adsorption specific surface area of the carbon black of 60 $m^2/g$ or greater, exhibited smaller rate of change of tan δ (20° C.) when the composition was over-vulcanized.

Furthermore, when Working Example 1 was compared to Working Example 5, Working Example 1, which had the ratio "sulfur/vulcanization accelerator" of 1.3 or less, exhibited even more reductions in power consumption at low temperatures and also exhibited smaller rate of change of tan δ (20° C.) when the composition was over-vulcanized.

On the other hand, Comparative Example 1, which had the total content of the butadiene rubber and the styrene butadiene rubber of less than 50% by mass relative to the content of the rubber component, exhibited insufficient reductions in power consumption at low temperatures.

Furthermore, Comparative Examples 2 to 4, which had the glass transition temperature of either the butadiene rubber or the styrene butadiene rubber of higher than −65° C. although the total content of the butadiene rubber and the styrene butadiene rubber was 50% by mass or greater relative to the content of the rubber component, also exhibited insufficient reductions in power consumption at low temperatures.

Furthermore, Comparative Example 5, which had the ratio "sulfur/vulcanization accelerator" of greater than 1.5, also exhibited insufficient reductions in power consumption at low temperatures. Furthermore, the rate of change of tan δ (20° C.) when the composition was over-vulcanized was large.

Furthermore, Comparative Example 6, which had the nitrogen adsorption specific surface area of the carbon black of greater than 90 $m^2/g$, exhibited insufficient reductions in power consumption at normal temperature and at low temperatures.

What is claimed is:

1. A rubber composition for a conveyor belt comprising:
   a rubber component containing butadiene rubber and/or styrene butadiene rubber, carbon black, sulfur, and a vulcanization accelerator;
   a glass transition temperature of the butadiene rubber and the styrene butadiene rubber being −65° C. or lower;
   a nitrogen adsorption specific surface area of the carbon black being 90 $m^2/g$ or less;
   a total content of the butadiene rubber and the styrene butadiene rubber being 50% by mass or greater relative to a content of the rubber component;
   a content of the carbon black being from 30 to 50 parts by mass per 100 parts by mass of the rubber component; and a mass ratio (sulfur/vulcanization accelerator) of a content of the sulfur to a content of the vulcanization accelerator being 1.5 or less.

2. The rubber composition for a conveyor belt according to claim 1, wherein the nitrogen adsorption specific surface area of the carbon black is 60 m$^2$/g or greater.

3. The rubber composition for a conveyor belt according to claim 1, wherein the rubber composition is used in a conveyor belt for use in cold regions.

4. A conveyor belt formed by using the rubber composition for a conveyor belt described in claim 1.

5. A conveyor belt comprising:
an upper cover rubber layer, a reinforcing layer, and a lower cover rubber layer;
at least the lower cover rubber layer being formed by using the rubber composition for a conveyor belt described in claim 1.

6. The conveyor belt according to claim 4, wherein the conveyor belt is for use in cold regions.

7. The rubber composition for a conveyor belt according to claim 2, wherein the rubber composition is used in a conveyor belt for use in cold regions.

8. A conveyor belt formed by using the rubber composition for a conveyor belt described in claim 2.

9. A conveyor belt formed by using the rubber composition for a conveyor belt described in claim 3.

10. A conveyor belt formed by using the rubber composition for a conveyor belt described in claim 7.

11. A conveyor belt comprising:
an upper cover rubber layer, a reinforcing layer, and a lower cover rubber layer;
at least the lower cover rubber layer being formed by using the rubber composition for a conveyor belt described in claim 2.

12. A conveyor belt comprising:
an upper cover rubber layer, a reinforcing layer, and a lower cover rubber layer;
at least the lower cover rubber layer being formed by using the rubber composition for a conveyor belt described in claim 3.

13. A conveyor belt comprising:
an upper cover rubber layer, a reinforcing layer, and a lower cover rubber layer;
at least the lower cover rubber layer being formed by using the rubber composition for a conveyor belt described in claim 7.

14. The conveyor belt according to claim 5, wherein the conveyor belt is for use in cold regions.

15. The conveyor belt according to claim 8, wherein the conveyor belt is for use in cold regions.

16. The conveyor belt according to claim 9, wherein the conveyor belt is for use in cold regions.

17. The conveyor belt according to claim 10, wherein the conveyor belt is for use in cold regions.

18. The conveyor belt according to claim 11, wherein the conveyor belt is for use in cold regions.

19. The conveyor belt according to claim 12, wherein the conveyor belt is for use in cold regions.

20. The conveyor belt according to claim 13, wherein the conveyor belt is for use in cold regions.

* * * * *